(12) United States Patent
Schneegans et al.

(10) Patent No.: US 9,006,605 B2
(45) Date of Patent: Apr. 14, 2015

(54) SHEET-METAL COMPOSITE, METHOD FOR JOINING SHEETS AND JOINING DEVICE

(75) Inventors: Jochen Schneegans, Wittgert (DE); Martin Kraft, Eichenzell (DE)

(73) Assignee: FFT Produktionssysteme GmbH & Co. KG, Fulda (DE)

( * ) Notice: Subject to any disclaimer, the term of this patent is extended or adjusted under 35 U.S.C. 154(b) by 770 days.

(21) Appl. No.: 12/523,248

(22) PCT Filed: Jan. 14, 2008

(86) PCT No.: PCT/EP2008/000227
§ 371 (c)(1),
(2), (4) Date: Sep. 10, 2009

(87) PCT Pub. No.: WO2008/086994
PCT Pub. Date: Jul. 24, 2008

(65) Prior Publication Data
US 2011/0170946 A1 Jul. 14, 2011

(30) Foreign Application Priority Data
Jan. 15, 2007 (DE) .................. 10 2007 002 856

(51) Int. Cl.
| | |
|---|---|
| B23K 26/00 | (2014.01) |
| B23K 33/00 | (2006.01) |
| B21D 39/02 | (2006.01) |
| B23K 1/00 | (2006.01) |
| B23K 1/005 | (2006.01) |
| B23K 26/02 | (2014.01) |
| F16B 5/08 | (2006.01) |

(52) U.S. Cl.
CPC ............ *B23K 33/008* (2013.01); *B21D 39/021* (2013.01); *B21D 39/023* (2013.01); *B23K 1/0008* (2013.01); *B23K 1/0056* (2013.01); *B23K 26/023* (2013.01); *F16B 5/08* (2013.01); *B23K 2201/006* (2013.01); *B23K 2201/18* (2013.01)

(58) Field of Classification Search
USPC ............ 219/121.63, 121.64, 121.76, 121.81, 219/121.85, 121.78; 403/271; 228/173.6, 228/15.1, 17; 29/243
See application file for complete search history.

(56) References Cited

U.S. PATENT DOCUMENTS 5,142,118 A * 8/1992 Schlatter .................. 219/121.63
5,229,571 A * 7/1993 Neiheisel ................. 219/121.63
(Continued)

FOREIGN PATENT DOCUMENTS

DE      3902163 A1 * 6/1990 ............. B21D 51/06
DE      100 23 351       12/2000
(Continued)

*Primary Examiner* — Thien S Tran
(74) *Attorney, Agent, or Firm* — RatnerPrestia

(57) ABSTRACT

A metal sheet composite comprising an outer metal sheet having a flange which is folded over around a flanging edge; an inner metal sheet which forms a joint with the flange; and a welding or soldering seam which is produced on or in the joint and fixedly connects the metal sheets to each other. A method for joining metal sheets and a device for flanging and welding or soldering are also disclosed. The device includes: a tool head; a flanging member, arranged on the tool head, for roll-flanging or slide-flanging; and a welding or soldering tool arranged on the tool head, wherein the flanging member and the welding or soldering tool are arranged such that the flanging member forms a pressing means for a welding or soldering process which can be performed using the welding or soldering tool.

9 Claims, 6 Drawing Sheets

(56) References Cited

U.S. PATENT DOCUMENTS

| | | |
|---|---|---|
| 5,897,796 A | 4/1999 | Forrest |
| 6,344,626 B1 | 2/2002 | Busuttil |
| 6,360,532 B2 | 3/2002 | Straehle et al. |
| 7,152,292 B2 | 12/2006 | Quell et al. |
| 2002/0079295 A1* | 6/2002 | Shikoda et al. .......... 219/121.63 |
| 2004/0118818 A1* | 6/2004 | Oda et al. ................. 219/121.64 |
| 2004/0134891 A1* | 7/2004 | Schumacher ............ 219/121.63 |
| 2004/0256366 A1* | 12/2004 | Kim et al. ................ 219/121.63 |
| 2006/0288752 A1 | 12/2006 | Burzlaff et al. |
| 2008/0031298 A1* | 2/2008 | Sakai et al. ..................... 372/55 |
| 2008/0307630 A1 | 12/2008 | Hasegawa et al. |

FOREIGN PATENT DOCUMENTS

| | | | |
|---|---|---|---|
| DE | 199 27 208 | 12/2000 | |
| DE | 100 11 954 | 9/2001 | |
| DE | 103 38 170 | 3/2005 | |
| EP | 1 420 908 | 3/2003 | |
| EP | 1 685 915 | 8/2006 | |
| JP | 56 009016 | 1/1981 | |
| JP | 2007 237283 | 9/2007 | |
| WO | WO 2006038678 A1 * | 4/2006 | ............ B23K 26/02 |

* cited by examiner

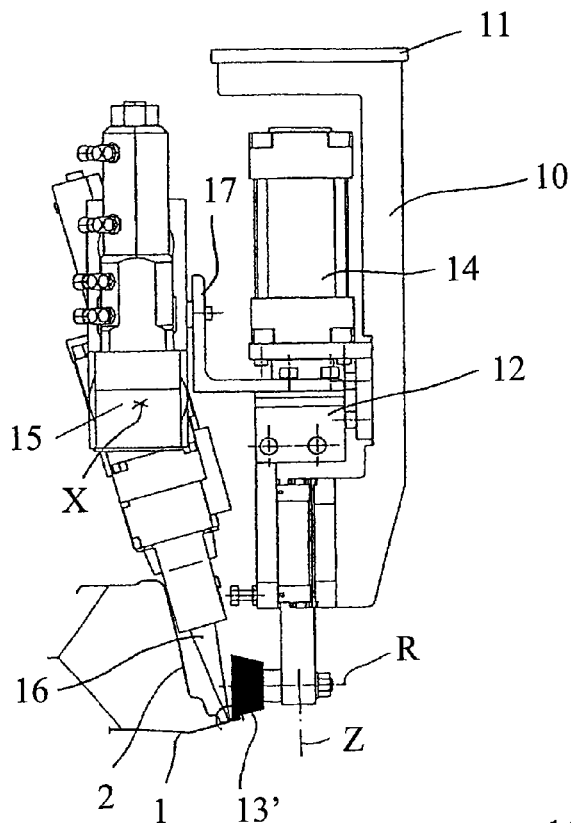
Figure 7
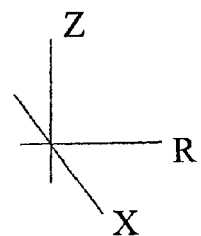
Figure 8
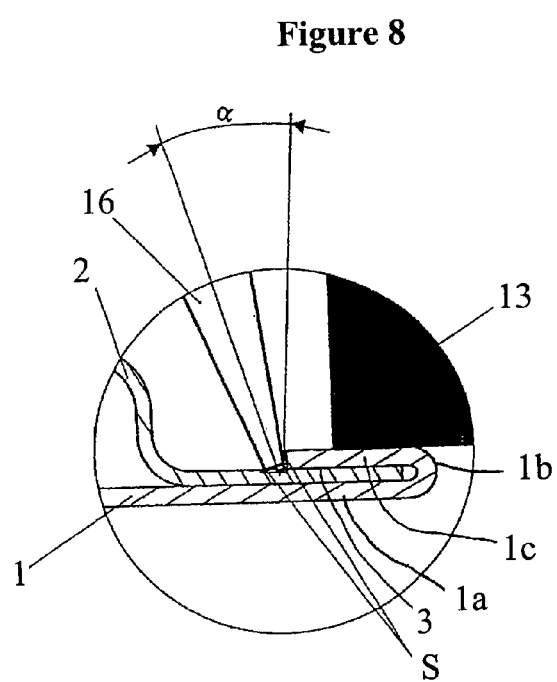

SHEET-METAL COMPOSITE, METHOD FOR JOINING SHEETS AND JOINING DEVICE

This application is the U.S. national phase application of PCT International Application No. PCT/EP2008/000227, filed Jan. 14, 2008, which claims priority to German Patent Application No. DE102007002856.5, filed Jan. 15, 2007, the contents of such applications being incorporated by reference herein in their entirety.

FIELD OF THE INVENTION

The invention relates to joining component parts, in particular metal sheets, including a welding or soldering process.

BACKGROUND OF THE INVENTION

Welding and soldering are proven joining methods for metallic component parts. In an automated welding or soldering process, the component parts to be joined are fixed in a joining position and pressed against each other near the current welding or soldering point using a pressing means—for example, a pressing finger or pressing roller—during the welding or soldering, wherein the pressing means together with the welding or soldering tool travels a joining region of the component parts in the longitudinal direction of a welding or soldering seam to be produced. The component parts have to be provided in a geometry which is suited to welding or soldering. Flanges which are suited to welding or soldering are shaped on the metal sheets to be joined, for example while still being plastically reshaped in a press, or in a reshaping process subsequent to shaping in a press, such as for example edging. If the flanges are shaped while still in the press, then limits are placed on the flange geometries which can be produced, due to the need to remove the part from the mold. Edging devices for subsequently shaping the flanges are voluminous and inflexible. Furthermore, complex edging sequences can only be achieved at great cost.

Hemming also has an established role in joining metal sheets, wherein the joining combination of roll-hemming and gluing is known, which achieves a positive-fit and material-fit connection. In composites which are subjected to dynamic stresses, the glue also has the function—in addition to that of increasing the rigidity—of damping or preventing noise such as may occur, which can be generated between the joined metal sheets. The glue also fulfills a sealing function. One advantage of roll-hemming technology is its high level of flexibility with regard to the geometry of component parts. Hemming tools and methods, or more generally flanging tools and methods, are for example described in EP 1 685 915 A1, EP 1 420 908 B1, DE 100 11 954 A1 and DE 103 38 170 B4.

SUMMARY OF THE INVENTION

It is an object of certain aspects of the invention to improve the joining of component parts, at least one of which is a metal sheet, with regard to its flexibility with respect to the progression of a flanging edge and the strength of the composite.

One aspect of the invention combines a flanging process with a welding or soldering process.

This combination of methods in accordance with the invention provides a metal sheet composite consisting of an outer metal sheet and an inner metal sheet and optionally one or more other metal sheets, in which the outer metal sheet comprises a flange which is flanged around a flanging edge and forms a joint with the inner metal sheet. A welding or soldering seam which fixedly connects the metal sheets to each other runs in or on the joint. The outer metal sheet is gently folded over by the flanging process which progresses continuously in the longitudinal direction of the flanging edge. In the transverse direction over the region of the flanging edge, the outer metal sheet exhibits a significantly more uniform, less cracked material structure than a metal sheet which has been shaped in the same geometry for example in a deep-drawing press. The same applies in comparison to a metal sheet in which the flange has been folded over in a conventional edging machine. Because the reshaping is progressive in the longitudinal direction of the flanging edge and therefore only ever local, the flanging edge can exhibit a complex progression comprising one or more bends, even bends exhibiting variable radii of curvature. The metal sheet composite in accordance with the invention is more rigid than a metal sheet composite comprising a conventional hemming connection, since the welding or soldering seam connects the metal sheets fixedly and absolutely rigidly to each other, at least in the immediate joining region. This is of particular benefit to metal sheet composites which are subjected to dynamic stresses, since the metal sheets can no longer move relative to each other and correspondingly rub against each other in the joining region, and can also therefore no longer generate noise. The welding or soldering seam also seals the joining region or at least an inner region of the joining region. It is advantageous if the seam extends continuously over the entire length of the joining region of the metal sheets, as measured in the longitudinal direction of the flanging edge.

When installed, for example on an automobile, the outer metal sheet is preferably visible from the outside and can in particular form an outer shell of a vehicle or also in principle any other structural unit, wherein the inner metal sheet correspondingly faces the interior of a vehicle or other structural unit. In principle, however, the terms "outer metal sheet" and "inner metal sheet" merely serve to distinguish these concepts, in order to explain that at least the outer metal sheet comprises a flanged welding or soldering flange. The flanging is visible on the outer side of the flange due to rolling or sliding marks if the surface has not been subjected to surface processing, which removes the marks, after flanging.

In preferred embodiments, the flange extends along an outer periphery of the outer metal sheet and forms only a narrow peripheral strip in comparison to the outer metal sheet as a whole. As viewed in the cross-section of the outer metal sheet, the flange is substantially shorter—over at least a predominant part of the length of the flanging edge—than an outer metal sheet region of the outer metal sheet which transitions into the flange via the flanging edge.

The joint can be a butt joint or in particular a lap joint and/or edge joint. If it is a lap joint, the welding seam can be an I seam. In the case of welding or soldering, the seam is more preferably formed as a hollow seam in the lap joint. The joint can be sealed over the entire joint length, as viewed in the cross-section of the composite, by means of a hollow seam at one end of the lap joint, thus most effectively counteracting gap corrosion.

The flange of the outer metal sheet can in particular form a slot in its flanging or hemming region, into which the inner metal sheet protrudes in order to form the lap joint on an interior side of the flange in relation to the slot. Although less preferred, it is however perfectly conceivable for the flange and the inner metal sheet to form a lap joint on the outer side of the flange which faces away from the slot. Furthermore, a slot-shaped flanging region is also advantageous when the inner metal sheet and the flange are welded or soldered to each other, forming a butt joint.

In preferred embodiments, the inner metal sheet is clamped in the slot between an outer periphery of the flange and an opposite region of the outer metal sheet facing the periphery of the flange, as is known in principle from conventional hemming connections. In such embodiments, it is preferably clamped on both sides over an area, in each case by surface pressing. In such embodiments, the outer metal sheet can in particular be shaped in a U-shaped cross-section in its flanging region which includes the flange. For receiving sealing compound in the joining region, it is advantageous if the outer metal sheet forms an eye-shaped hollow space, as viewed in cross-section, in a flanging base which includes the flanging edge.

In modified but equally preferred embodiments, in which the inner metal sheet is not clamped in the slot or not to any appreciable extent, the flange points at an inclination away from the region of the outer metal sheet which faces opposite. The slot thus narrows in the direction of the flanging base which includes the flanging edge.

In example embodiments, the flange can exhibit a curved progression in the cross-section of the metal sheet composite. Preferably, however, the flange is straight in the cross-sections.

Another aspect of the invention is particularly suitable for use in vehicle manufacture, i.e. for metal sheet composites on air craft, space craft, water craft and land craft, preferably automobiles. The metal sheet composite can in particular be a constituent of the outer shell of a vehicle. One primary use is as attachment parts of vehicles, in particular automobiles, such as for example doors, sunroofs, hatchbacks, boot lids and bonnets. In addition to such movable attachment parts, however, the invention is also suitable for attachment parts which are attached to a body but which themselves, once attached, form a fixed constituent of the body, such as for example attached mudguards. Furthermore, the invention is also suitable for manufacturing the body before attachment parts are attached. Thus, the invention can in particular be used for manufacturing side parts or a roof of a vehicle, in particular an automobile. One primary application, is for example so-called wheel arch hemming, on a mudguard before it is installed or when it is installed or on a side part of the body. In addition, the invention is also suitable for producing the connection between a side part and a roof of a body in a production line. In principle, however, the invention is also suited to manufacturing other multi-dimensional composite structures, since the flanging process which is used in accordance with the invention is not in principle subject to any restriction with regard to the geometry of the connecting flange of the metal sheets. The more complexly the metal sheet to be flanged and in particular the flanging edge are shaped, the more the advantages of the invention over the conventional methods come to bear. While the invention is particularly advantageous for the vehicle industry, it can however also in principle be used in other industries.

In a joining method in accordance with the invention, the outer metal sheet and the inner metal sheet are fixed relative to each other in a joining position. The flange is folded over around the flanging edge on the outer metal sheet by means of a flanging member which is moved in the longitudinal direction of the flanging edge. The flanging edge can already be pre-shaped to a certain degree in a preceding reshaping process in a press by for example deep-drawing or embossing or can be shaped for the first time in a flanging process subsequent to the original metal sheet shaping process. The flange can be folded over by means of the flanging member into the position or orientation required for welding or soldering, outside the joining position, and the outer metal sheet only then fixed in the joining position. Alternatively, the outer metal sheet can also be flanged in the joining position using the flanging member, and the inner metal sheet only then fixed in the joining position. In preferred embodiments, however, the outer metal sheet and inner metal sheet are fixed relative to each other in the joining position in a first method step, and the flanging and welding or soldering are only performed once they are fixed. In such embodiments, it is then possible to fold the flange over again by means of the flanging member in a second step, such that it forms a joint with the inner metal sheet, and to only weld or solder the metal sheets to each other on or in the joint in a third step which is subsequent to but separate from the flanging step. In a particularly preferred method embodiment, however, the two processes of flanging and welding or soldering are performed together, by simultaneously using the flanging member as a reshaping tool and a pressing means for the welding or soldering process. In such embodiments, the flanging member replaces, in a second function, the pressing fingers or pressing rollers known from conventional welding or soldering processes.

Yet another aspect of the invention includes a device which can both flange and weld or solder. It is a combined tool comprising a tool head, a flanging tool which is arranged on the tool head and comprises at least one flanging member, and a welding or soldering tool which is arranged on the tool head. The flanging member and the welding or soldering tool are arranged such that the flanging member forms a pressing means for the welding or soldering tool for performing the latterly mentioned, particularly preferred method embodiment, if the welding or soldering tool produces the welding or soldering seam. The flanging tool can comprise a number of flanging members which are optionally arranged in a processing position on the tool head, such that they can move, for performing a flanging process; in preferred simple embodiments, however, the tool head only bears a single flanging member which furthermore preferably always assumes the processing position.

The flanging member mentioned in connection with the device and the method can in particular be a flanging roller or alternatively also a sliding piece which slides on the flange in the longitudinal direction of the flanging edge during flanging. In the preferred embodiments, the flanging process correspondingly consists of roll-flanging or, as applicable, slide-flanging.

The welding or soldering tool can in particular be designed such that it generates the heat required for the welding or soldering by means of an energy beam. In preferred embodiments, the welding or soldering tool is a laser welding or soldering tool. In equally preferred embodiments, it is a gas-shielded welding tool. Instead of a welding or soldering tool which operates using an energy beam, however, it is in principle also possible to use welding or soldering tools which weld or solder in other ways.

If the welding or soldering tool is one which generates the heat required for the connection by means of an energy beam, the flanging member and the welding or soldering tool are preferably arranged on the tool head such that the pressure force exerted locally by the flanging member during flanging and the energy beam charge the composite to be produced, at a small distance next to each other. The distance is selected such that the pressure force exerted by the flanging member at the welding or soldering location still reliably ensures that the component parts are pressed against each other and cannot diverge. The distance preferably measures at least 1 mm and at most 6 mm, as viewed in the longitudinal direction of the flanging edge. Particularly advantageous values from said range of distances are at least 2 mm and at most 4 mm, and particularly advantageous values from this narrower range are in turn those around 3 mm. If the flanging member is a flanging roller, then it is clear that the energy beam follows the flanging roller, wherein the distance is measured between the center of the energy beam at the location of impact and a location, nearest to the center, on the pressure line or narrow pressure strip in which the flanging roller is in contact with the flange. If the flanging member is a sliding piece and if the sliding piece is in contact with the flange not only along a pressure line or a pressure strip which is narrow in the longitudinal direction of the flanging edge, the distance is measured between the center of the energy beam and a nearest point on the sliding piece at which the flange is folded into its joining position, in which it is welded or soldered to the inner metal sheet. That which has been said above in relation to the energy beam also applies analogously to welding or soldering tools which introduce the energy required for the welding or soldering into the joining region in other ways In particular for producing a hollow seam, it is advantageous if the tool head includes a seam tracking system using which the welding or soldering tool is made to follow the butt joint which exists at the end of the lap joint and in which the seam is to be produced. The seam tracking system includes a sensor for scanning the butt joint, preferably tactilely, and a compensating mechanism which enables movements of the welding or soldering tool relative to the flanging member. The compensating mechanism can be designed such that it only allows translational compensating movements or only allows rotational compensating movements or preferably allows translational and rotational compensating movements. The welding or soldering tool can thus exhibit one or more degrees of freedom of mobility relative to the flanging member in the common processing position via the compensating mechanism on the tool head. The welding or soldering tool is preferably held in a neutral position and orientation in relation to the one or more degrees of freedom, by means of a spring force in each case. For compensating, the welding or soldering tool can in particular be pivotable about an axis which is parallel to the longitudinal direction of the flanging edge at the current effective location during a processing run of the device. As an alternative or preferably in addition, an ability to move towards and away from the butt joint is also advantageous.

Due to the spatial vicinity of the flanging member to the welding or soldering tool, it is advantageous if a cleaning means is arranged on the tool head, using which the flanging member can be cleaned during the flanging and welding or soldering. The cleaning means can include a brush or scraper or a means for charging the flanging member with dry ice.

BRIEF DESCRIPTION OF THE DRAWINGS

Example embodiments of the invention are illustrated below on the basis of figures. Features disclosed by the example embodiments, each individually and in any combination of features, advantageously develop the subjects of the embodiments illustrated herein. There is shown:

FIG. 7 a joining device in accordance with the invention, comprising a flanging member and a welding tool, while performing a joining method in accordance with the invention;

FIG. 8 a joining region of FIG. 7, in an enlarged representation and comprising another flanging member;

DETAILED DESCRIPTION OF THE PREFERRED EMBODIMENTS

Figure 1:
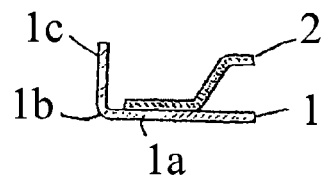
FIGS. 1 to 4 a hemming process for joining metal sheets.

FIGS. 1 to 4 show a method sequence in which a metal sheet composite is manufactured by roll-flanging. Each figure shows a cross-section of a peripheral region of an inner metal sheet 2 and an outer metal sheet 1 which are fixed relative to each other in a joining position by means of a chucking device. In a preceding process of plastic reshaping, for example deep-drawing, the metal sheets 1 and 2 have acquired their final shape as desired for the respective connection, except for the subsequent reshaping which is still required for connecting. Both metal sheets 1 and 2 are three-dimensionally warped structures which each comprise a flange suited to the hemming connection in the joining region shown, wherein the flange of the inner metal sheet 2 is pressed against the outer metal sheet 1 over an area by the chucking device. In an outer metal sheet region 1a, the outer metal sheet 1 transitions into a flange 1c via a sharp bend 1b. The flange 1c is successively folded over completely in the direction of the flange of the inner metal sheet 2, in a number of flanging steps. During flanging, the bend 1b forms a flanging edge in each case and is therefore referred to in the following as the flanging edge 1b. The flange is folded over using a flanging roller 13 which is mounted on the tool head such that it can rotate about a rotational axis R. In the example embodiment, the flange 1c is folded over by a total of 90° in three steps.

Figure 2:
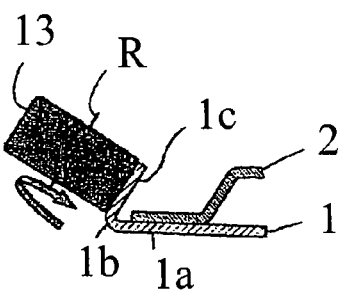
Figure 3:
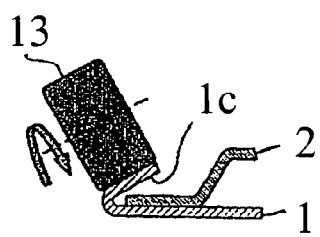
Figure 4:
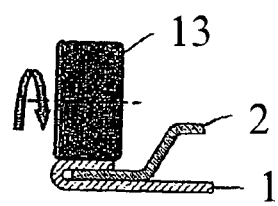

FIG. 2 shows the first flanging step, in which the running surface of the flanging roller 13 which rolls off on the flange 1c in the longitudinal direction of the flanging edge 1b is applied to the flange 1c which has not yet been flanged, at an angle of about 30°, such that the flange 1c is folded over towards the flange of the inner metal sheet 2 by said applying angle when the running surface rolls off on it. In FIG. 3, the running surface of the flanging roller 13 is again applied at an angle of about 30° to the flange 1c which was folded over in the first flanging step, such that the flange 1c is folded over by another 30° in the second processing run. In the final processing run, shown in FIG. 4, the flange is folded over by another 30° and thus completely folded over and pressed against the flange of the inner metal sheet 2 by the flanging roller 13. In the final flanging step, the flanging roller 13 serves as a final-flanging roller. In the final processing run or flanging step, the flanging roller 13 is preferably supported on the tool head via a spring force, wherein the spring force acts in the direction of the flange 1c. In the two preceding steps, the flanging roller 13 is preferably supported on the tool head such that it does not yield, in order to obtain a defined flange geometry in each step. Once the hemming connection has been completed, as shown in FIG. 4, the outer metal sheet 1 forms a U-shaped slot in the region of the flange 1c, in which the connecting flange of the inner metal sheet 2 is fixedly clamped between the outer metal sheet region 1a and the flange 1c, in each case by surface pressing. Before hemming, a sealing compound is introduced into the hemming region, in order to prevent gap corrosion between the metal sheets 1 and 2 which are clamped against each other and, in the case of dynamic stresses, to at least damp the noise generated by relative movements.

Figure 5:
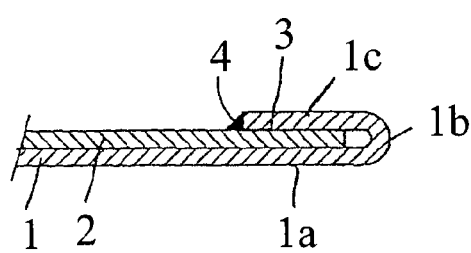
FIG. 5 a metal sheet composite in accordance with the invention in a first example embodiment.

FIG. 5 shows the joining region of a metal sheet composite in accordance with the invention in a first example embodiment. The metal sheet composite is formed by an outer metal sheet 1 and an inner metal sheet 2 which are connected to each other in a positive fit, frictional fit and material fit by means of a hemming connection and a welding connection. The hemming connection geometrically matches the hemming connection described above. It can also in particular be produced as illustrated by way of example on the basis of FIGS. 1 and 4. The welding connection is formed by a hollow seam 4 which is produced by a welding tool when the flange 1c is completely folded over up to and against the inner metal sheet 2. The completely folded-over flange 1c forms a lap joint 3 with the flange of the inner metal sheet 2 in the joining region, i.e. in the slot of the outer metal sheet 1, wherein the flange 1c and the flange of the inner metal sheet 2 lie one on top of the other over an area in said lap joint 3 and sealing compound is preferably provided in the lap joint 3. The hollow seam 4 runs on the lap joint 3, i.e. along the free outer periphery of the flange 1c.

The welding seam 4 can be produced in a processing run of a welding tool which is separate from the final-flanging step. Preferably, however, the flanging tool and the welding tool perform a processing run together during the final-flanging, as shown in FIG. 4, in which the flanging tool together with the flanging roller 13 forms a pressing means for the welding tool by producing the seam 4 during the processing run at the location at which the flanging roller 13 exerts a pressure force on the flange 1c which is sufficient for welding, such that the free periphery of the flange 1c is fixedly pressed against the inner metal sheet 2 by the flanging roller 13 during the welding and cannot diverge from the inner metal sheet 2 in this region. A laser welding apparatus is used as the welding tool, which melts the joining region locally at the current effective location and feeds welding material to the current melting region during the processing run. The welding seam 4 ensures an absolutely fixed connection between the metal sheets 1 and 2 in the joining region, where it prevents relative movements between the metal sheets 1 and 2, such that noise can no longer be generated due to dynamic stresses. The welding seam 4 also seals the joining region directly at the outer end of the lap joint 3, i.e. it also fulfills a sealing function. Sealing compound is therefore no longer necessarily required in the joining region, i.e. in the slot of the outer metal sheet 1, although the metal sheet composite in accordance with the invention also preferably contains sealing compound between the metal sheets 1 and 2 in the joining region.

Figure 6:
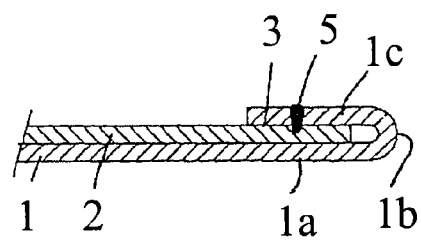
FIG. 6 a metal sheet composite in accordance with the invention in a second example embodiment.

FIG. 6 shows a metal sheet composite in accordance with the invention in a second example embodiment which only differs from the metal sheet composite of the first example embodiment with regard to the welding connection. In the second example embodiment, a welding seam 5 runs in the lap joint 3, at least substantially parallel to the flanging edge 1b. The welding seam 5 is an I seam. In order to produce the welding seam 5, a laser welding tool travels the flange 1c after final-flanging or preferably—as illustrated on the basis of the first example embodiment—directly during final-flanging and melts it continuously, progressively and respectively locally in the longitudinal direction of the flanging edge 1b. The forward speed and laser output are adjusted to each other such that the laser beam also locally melts the inner metal sheet 2 underneath the flange 1c. The melting region thus spans the flange 1c and extends into the inner metal sheet 2. Once hardened, the fixed welding connection is formed behind the laser beam. Producing the welding seam 5 makes lesser demands on the welding process with regard to the precision of the seam progression and thus with regard to guiding the welding tool. However, the welding seam 4 at the end of the lap joint 3 ensures that the entire joining region is sealed and therefore further assists in preventing gap corrosion. Another advantage of the welding seam 4 formed at the end of the lap joint 3 is the potential to save on material, since the length of the flange 1c as viewed in cross-section is shorter than that of the second example embodiment, and material can thus be saved in the outer metal sheet 1.

FIG. 7 shows a device using which it is possible to close a hem, i.e. to complete a hemming connection, and to weld in the hemming region in the same processing run. The device comprises a tool head 10 which forms a framework for a flanging tool 12 and a welding tool 15—in the example embodiment, a laser welding tool. The tool head 10 also includes a connector 11 for fastening to an actuator which can be moved spatially. The actuator can in particular be formed by the end of a robot arm. Of the metal sheets 1 and 2, only the joining region and its immediate environment are shown again. The inner metal sheet 2 already protrudes upwards away from the outer metal sheet 1 near the flange 1c, which significantly impairs accessibility for the welding tool 15. The flange shaped on the inner metal sheet 2 for joining is thus very short. In order to still be able to direct the welding beam 16 onto the desired location in the joining region, a conical flanging roller 13' is used for final-flanging instead of a circular-cylindrical flanging roller. The welding tool 15 can then be applied more steeply to the joining region. The flanging roller 13' can rotate about its rotational axis R and is also supported on the tool head 10, against a restoring spring force, such that it can be moved linearly along an axis Z which is perpendicular to the rotational axis R and the local longitudinal direction X of the flanging edge 1b. The elasticity of the support which is desired for final-flanging is obtained by means of a pneumatic unit 14, by fastening the flanging roller 13' to a piston rod of the pneumatic unit 14 such that it can rotate about the rotational axis R. The flanging roller 13' does not exhibit any other degree of freedom relative to the tool head 10 beyond its ability to rotate and to move translationally along the axis Z. The movement axis Z is indicated next to the device in FIG. 7 in a Cartesian co-ordinate system which is stationary relative to the tool head 10. The rotational axis R forms another axis of this co-ordinate system. During the processing run, the third axis X coincides with the longitudinal direction of the flanging edge 1b at the current effective location of the flanging roller 13'.

The laser tool 15 is also fixedly connected to the tool head 10 via a connecting flange 17, i.e. the connecting flange 17 is understood as a fixed framework part of the tool head 10. The fixed connection ensures that the laser tool 15 is arranged in a defined position and orientation relative to the flanging roller 13'. Within this fixed arrangement, compensating movements of a laser head of the laser tool 15 relative to the flanging roller 13' are however possible, via which the laser head can in particular compensate for unevenness in the joining region. To this end, the laser head or the entire laser tool is supported on the tool head 10 via a compensating mechanism. The compensating mechanism enables pivoting movements about the X axis and translational movements towards and away from the joining region. The compensating mechanism mounts the laser head or laser tool in relation to these two degrees of freedom of mobility, such that it can pivot back and forth about a neutral position, against a spring force in each case, and also such that it can move translationally back and forth, respectively against a restoring spring force.

FIG. 8 shows the joining region in an enlargement. Of the device, only the flanging roller—which, unlike in FIG. 7, is shown in FIG. 8 as a circular-cylindrical flanging roller 13—and the laser beam 16 can be seen. The flanging roller 13 could be replaced with the flanging roller 13', although this would alter the inclination angle $\alpha$ of the laser beam 16. The inclination angle $\alpha$ is measured between a straight line which is perpendicular to the flange 1c in the effective location and a central beam axis of the laser beam 16. In the example embodiment, a hollow seam 4—such as has been described for the first example embodiment of a metal sheet composite on the basis of FIG. 5—is produced by means of the device. For producing the hollow seam 4, the laser beam 16 is directed onto the end of the lap joint 3. The inclination angle $\alpha$ should measure at least 5°, in order that not only the inner metal sheet 2 but also the periphery of the flange 1c is melted. Selecting the inclination angle $\alpha$ in this way ensures that the melting region S extends over the entire corner region of the butt joint, as shown in FIG. 8, such that the welding material fed during welding is uniformly connected to the flange 1c and the inner metal sheet 2.

When using the conical flanging roller 13', this results in an upper conicity value which is still favorable for welding. The conicity of the flanging roller 13', i.e. the inclination of the running surface of the flanging roller 13' with respect to the rotational axis R, then preferably measures 15° at most.

Figure 9:
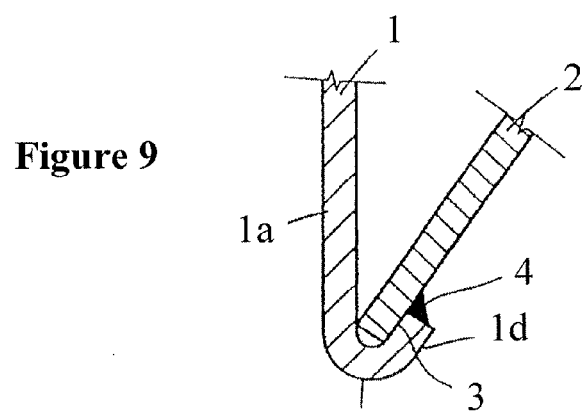
FIG. 9 a metal sheet composite in accordance with the invention in a third example embodiment.

FIG. 9 shows a metal sheet composite in accordance with the invention in a third example embodiment. The metal sheet composite differs from the first and second example embodiments in the shape of the slot formed in the joining region by flanging. During flanging, the flange of the outer metal sheet 1—referred to as 1d in order to distinguish it—is not folded over as far as in the first and second example embodiments. The flange 1d is folded over in the direction of the metal sheet region 1a which is adjacent via the flanging edge 1b, during flanging, only far enough that a V-shaped slot is obtained, i.e. after flanging, the flange 1d points at an oblique inclination with respect to the metal sheet region 1a. The inclination angle is preferably selected such that the flange 1d can be folded over into the final shape shown in one or at most two flanging steps, if—as is assumed, merely by way of example, on the basis of FIG. 1—flanging proceeds from an outer metal sheet 1 in which the flange 1d already projects approximately at right angles from the metal sheet region 1a before flanging. The flange of the inner metal sheet 2 protrudes into the slot, and the free periphery of the flange of the inner metal sheet 2 protrudes up to and against the inner side of the metal sheet region 1a facing the flange 1d. Depending on the thickness of the metal sheets, the inner metal sheet 2 can also protrude into the base of the slot.

Figure 10:
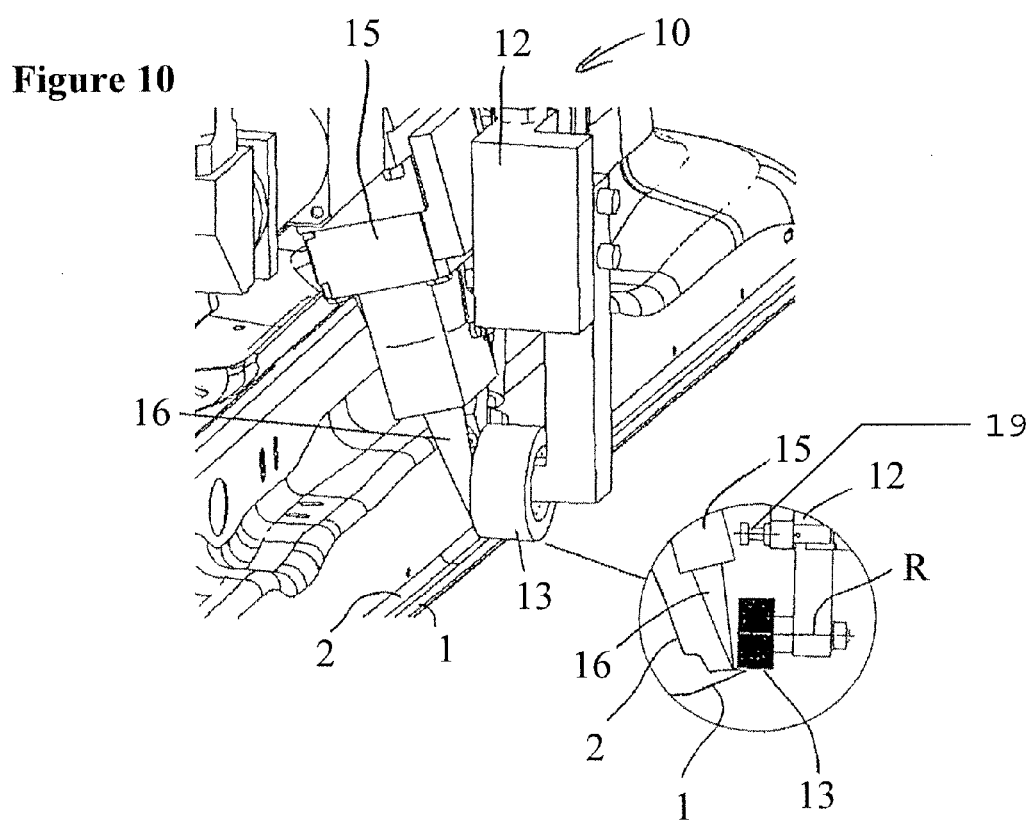
FIG. 10 the joining device in accordance with the invention, while producing the metal sheet composite of the third example embodiment.

FIG. 10 shows the device in accordance with the invention, comprising a circular-cylindrical flanging roller 13, while flanging and simultaneously welding a metal sheet composite comprising the joining region shown in FIG. 9. The metal sheet composite can for example form a door for an automobile. The joining region is also shown in the detail together with the flanging and laser tools 12 and 15 which act in said region. Except for the joining region, the metal sheet composite corresponds to the metal sheet composite of FIGS. 7 and 8. As can be seen on the basis of the detailed representation in FIG. 10, the accessibility for the laser tool 15 in the joining region is improved by the shape of the inner metal sheet 2—the flange of which is inclined with respect to the metal sheet region 1a in the joining position—and the consequently incomplete folding over of the flange 1d. Final-flanging is possible using the circular-cylindrical flanging roller 13, while the laser beam 16 can be simultaneously directed onto the joining region at an inclination angle $\alpha$. (FIG. 8) which is favorable for melting the corner and/or melting region S. The orientation of the flange of the inner metal sheet and the resultant shape of the flange 1d, i.e. the slot formed between the flange 1d and the metal sheet region 1a, is—as shown by the example embodiment—particularly advantageous when the inner metal sheet 2 already protrudes upwards near the joining region in relation to the opposite outer metal sheet 1 and thus significantly restricts the space available to the laser tool 15 between the flanging roller 13 or 13' and the region of the inner metal sheet 2 which protrudes upwards and is trough-shaped in the example embodiment.

Before flanging and welding, the outer metal sheet 1 and the inner metal sheet 2 are fixed relative to each other in the joining position shown in FIG. 10, wherein the circumferential flange of the inner metal sheet 2 is pressed against the metal sheet region 1a which borders the flanging edge 1b. Unlike the first and second example embodiments, the flange of the inner metal sheet 2 does not abut the opposite metal sheet region 1a over an area in the joining position, but rather has substantially only linear contact circumferentially, as shown by the detailed representation in FIG. 10 and in particular by FIG. 9. The linear contact, or a contact between the metal sheets 1 and 2 in general, is advantageous for flanging, since this prevents or at least substantially prevents the inner metal sheet 2 from yielding when the flange is or 1d is folded over up to and against the flange of the inner metal sheet 2 in order to form the lap joint 3. FIG. 10 shows the joining device in this final flanging step of a number of flanging steps, or preferably the but one flanging step in total. In order to manage with as short a flange 1d as possible for joining, the welding seam 4 is again produced, as in the first example embodiment, as a hollow seam on the lap joint 3.

Due to the spatial vicinity of the flanging member to the welding or soldering tool, it is advantageous if a cleaning means 19, such as a brush for example, is arranged on the tool head, by which the flanging member can be cleaned during the flanging and welding or soldering.

Figure 11:
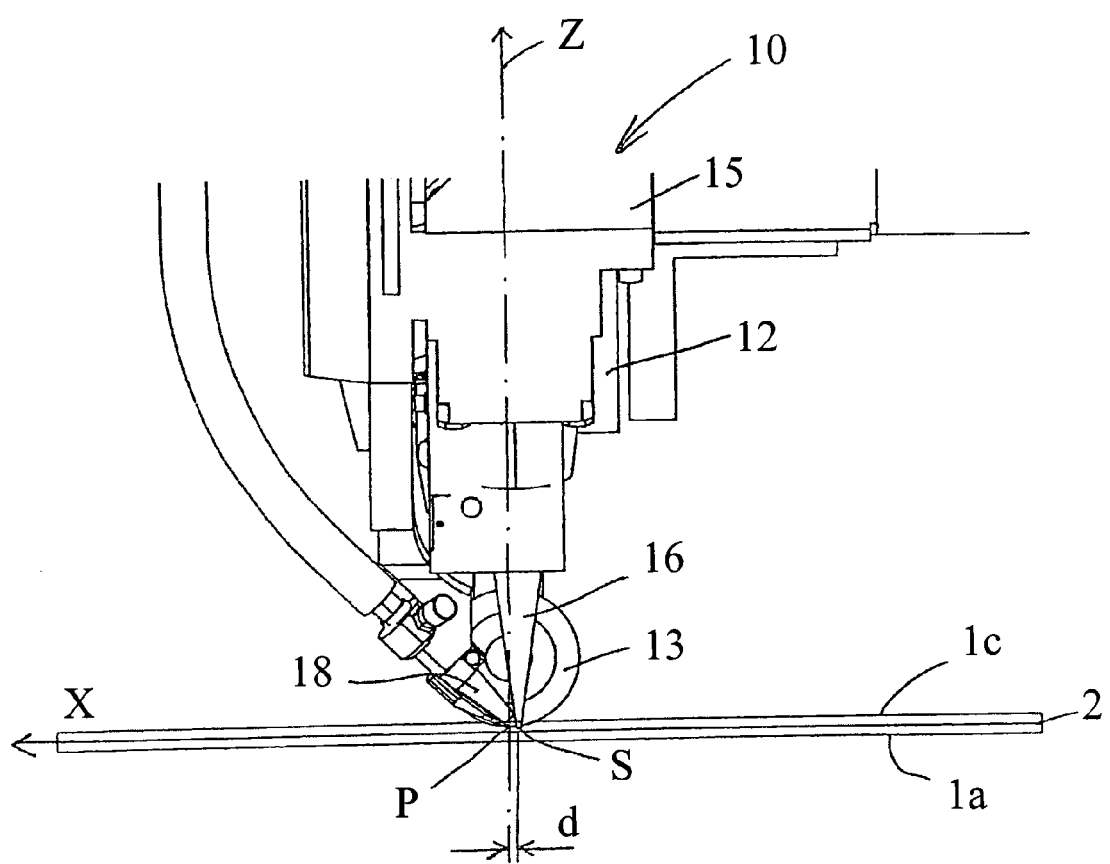
FIG. 11 the joining device in accordance with the invention, in the joining region.

FIG. 11 shows the joining device during the processing run in a view onto a longitudinal sectional plane through the joining region of the metal sheet composite 1, 2 of the first example embodiment, in which the flange 1c and the opposite metal sheet region 1a of the outer metal sheet 1 form a U-shaped slot. The direction of movement of the joining device is indicated by a directional arrow on the X axis of the tool head 10. The laser beam 16 is directed onto the melting region S, while the flanging roller 13 on a pressure line P, which in practice is a narrow pressure strip, acts on the flange 1c and via the flange is on the inner metal sheet 2 and the metal sheet region 1a of the outer metal sheet 1. The melting region S, which is punctiform in a first approximation, follows the pressure line P during the processing run at a small distance d due to the described arrangement of the flanging tool 12 and the laser tool 15 on the same tool head 10. If, as has been assumed in the example scenario, the metal sheet composite is a door or other attachment part or also a body part of an automobile, then the distance d preferably measures about 3 mm given the thicknesses of the metal sheets typical for such metal sheet composites and the forward speeds usual for flanging tools and also the adapted laser output. Irrespective of this specific application, the distance d is selected such that the pressure exerted by the flanging roller 13 on the flange 1c in the melting region S is still large enough to press the flange 1c fixedly against the inner metal sheet 2 at its outer periphery which forms a part of the melting region S, such that the flange 1c no longer diverges from the inner metal sheet 2 in the melting region S and a clean welding seam 4 can be produced in the form of a hollow seam.

In order to compensate for any unevenness and other irregularities which may occur along the flanging edge 1b in the current melting region S, the laser tool 15 includes a tactile sensor 18 which is immovably connected to the laser head. The tactile sensor 18 is a narrow finger which scans the end of the lap joint between the flange 1c and the inner metal sheet 2, before the melting region S in the direction of movement X, and follows the laser head within the context of its ability to pivot and move translationally, due to its fixed connection to the laser head.

Figure 12:
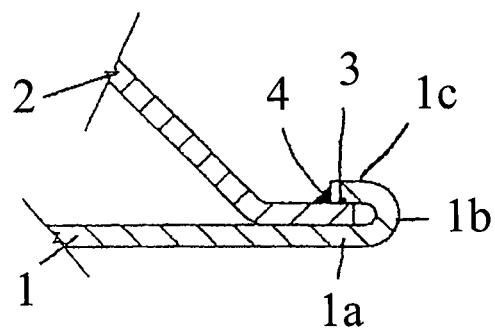
FIG. 12 a metal sheet composite in accordance with the invention in a fourth example embodiment.

FIG. 12 shows the joining region of a metal sheet composite in accordance with the invention in a fourth example embodiment, which corresponds to the joining region of the first example embodiment except for one deviation: the flange 1c and correspondingly the lap joint 3 are shorter than in the joining region shown in FIG. 5. This correspondingly also shortens the region which is potentially threatened by gap corrosion; in particular, however, material is saved in the outer metal sheet 1. Due to the welding connection, shortening the length of the lap joint 3 does not or not appreciably affect the rigidity and strength of the joining connection.

Figure 13:
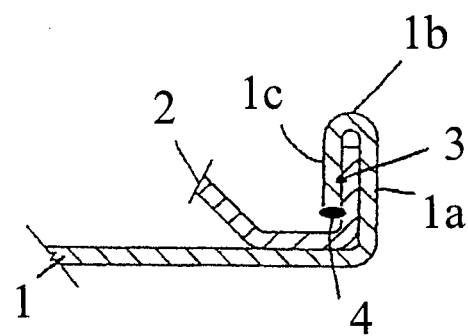
FIG. 13 a metal sheet composite in accordance with the invention in a fifth example embodiment.
Figure 14:
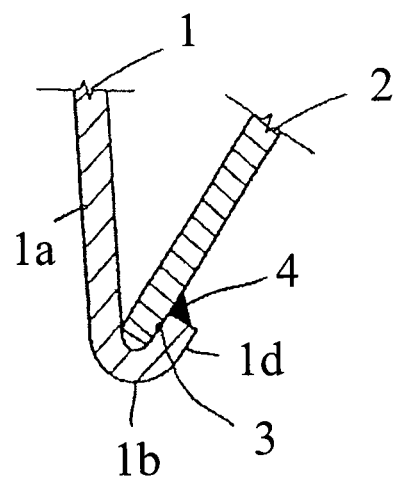
FIG. 14 the metal sheet composite of the third example embodiment.
Figure 15:
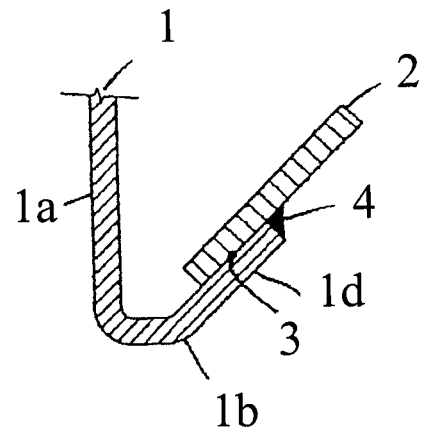
FIG. 15 a metal sheet composite in accordance with the invention in a sixth example embodiment.

FIG. 13 shows a metal sheet composite in accordance with the invention in a fifth example embodiment, comprising a joining region which corresponds to the first example embodiment as far as the hemming connection and the welding connection only are directly concerned. The geometry of the metal sheet composite, however, is as a whole less favorable than in the first and fourth example embodiments (FIGS. 5 and 12), since the accessibility for the flanging tool and in particular the accessibility for the welding tool is significantly impaired due to the geometry of the metal sheet composite FIG. 14 shows again the metal sheet composite of the third example embodiment. By way of comparison with this, FIG. 15 shows a metal sheet composite in accordance with the invention in a sixth example embodiment, which differs from the metal sheet composite of the third example embodiment in that the inner metal sheet 2 protrudes into the slot formed between the flange 1d and the metal sheet region 1a but not up to an abutting contact with the outer metal sheet 1. Another difference is that the outer metal sheet 1 deviates twice in the region of the slot. The flanging edge 1b is offset at a small distance from the additional sharp bend which leads directly into the metal sheet region 1a. A third and final difference is the length of the flange 1d and lap joint 3 which is greater than in the third example embodiment.

Figure 16:
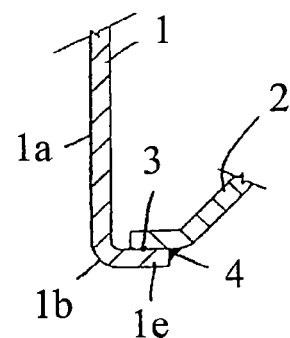
FIG. 16 a metal sheet composite in accordance with the invention in a seventh example embodiment.

FIG. 16 shows a metal sheet composite in accordance with the invention in a seventh example embodiment. In the seventh example embodiment, the flange—referred to as 1e in order to distinguish it—is not folded over as far in the direction of the metal sheet region 1a from which it projects via the flanging edge 1b, such that it does not have any directional component in common with the adjacent metal sheet region 1a and in particular does not form a slot with it. When producing the hemming connection, the flange 1e is folded over around the flanging edge 1b by means of the flanging tool 12, as described on the basis of the other example embodiments, such that it encloses an angle of for example 90°, as shown in the example embodiment, or an angle greater than 90° with the metal sheet region 1a which borders it via the flanging edge. The flange 1e can simply lengthen the metal sheet region 1a in a straight line only before the folding over. The welding seam 4 is produced as a hollow seam on the lap joint 3 by means of the welding tool 15, as in the first example embodiment.

Figure 17:
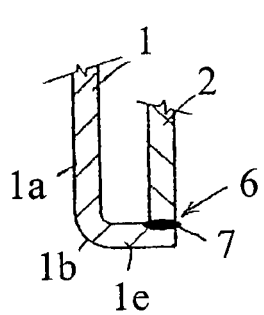
FIG. 17 a metal sheet composite in accordance with the invention in an eighth example embodiment.
Figure 18:
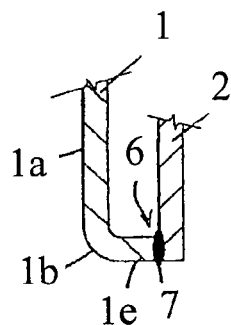
FIG. 18 a metal sheet composite in accordance with the invention in a ninth example embodiment.
Figure 19:
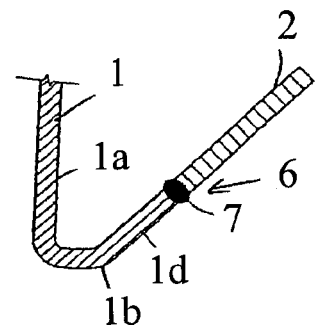
FIG. 19 a metal sheet composite in accordance with the invention in a tenth example embodiment.

FIGS. 17 to 19 show another three example embodiments of metal sheet composites in accordance with the invention. Unlike the metal sheet composites of the example embodiments described thus far, the joint is formed between the metal sheets 1 and 2 not as a lap joint but rather as a butt joint 6. The welding seam 7, which preferably covers the entire region of the joint 6, can for example be produced as a V seam. In the example embodiments of FIGS. 17 and 18, the flange 1e is folded over in accordance with the example embodiment of FIG. 16, such that it encloses an angle of 90° or more with the metal sheet region 1a. In the example embodiment of FIG. 19, the flange 1d has only been folded over around the flanging edge 1b by an angle of at most 90° in one or more flanging steps, but the metal sheet already comprises a beveled flange before the flanging in which the flange 1d has been folded over again by flanging in accordance with the invention. As a result, a slot is again obtained, but with two edges—on the one hand, the edge which has already been formed previously, and on the other, the flanging edge 1b.

In the example embodiment of FIG. 17, an inner side of the flange 1e is placed against a facing side of the metal sheet 2. In the example embodiment of FIG. 18, an inner side of the inner metal sheet 2 presses against the facing side of the flange 1e during welding. In the example embodiment of FIG. 19, the facing sides of the flange 1d and the metal sheet 2 are each pressed against each other and welded to each other while they are chucked in this way.

Figure 20:
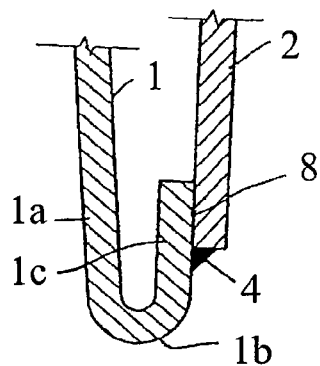
FIG. 20 a metal sheet composite in accordance with the invention in an eleventh example embodiment.

FIG. 20 shows an example embodiment in which the metal sheets 1 and 2 are connected to each other by means of a welding seam which extends along the outer side of the flange 1c. On the outer side of the flange 1c, the flange 1c and the metal sheet 2 form a lap joint which is provided with the reference sign 8 in order to distinguish it from the lap joint 3 on the inner side of the flange 1c. The flange 1c and the metal sheet region 1a which borders it via the flanging edge 1b form a slot, and the flange 1c is therefore referred to as 1c in accordance with the example embodiments of FIGS. 5, 6, 12 and 13, although the metal sheet 2 is not positioned in the slot thus formed, but rather forms the lap joint 8 with the outer side of the flange 1c, as already mentioned.

Figure 21:
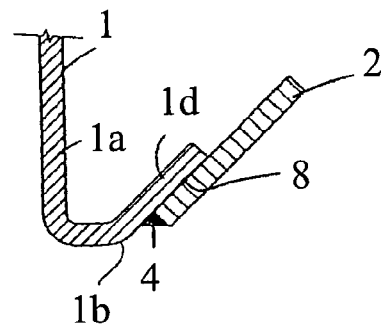
FIG. 21 a metal sheet composite in accordance with the invention in a twelfth example embodiment.

FIG. 21 corresponds to the example embodiment of FIG. 20 with regard to the lap joint and the welding seam 4 and to the example embodiments of FIGS. 15 and 19 with regard to the shape of the metal sheet in the region of the flange 1d, such that reference is made to the respective statements made with respect to these example embodiments.

The flanging welding connections of FIGS. 5, 6 and 12 to 19 can be produced in the same processing run of the device in accordance with the invention, using a leading flanging tool and a trailing welding tool. In the case of the connections in the example embodiments of FIGS. 20 and 21, the respective flange 1c or 1d is folded over in a separate flanging method, then the metal sheets 1 and 2 are fixed, i.e. chucked, relative to each other with the lap joint 8, and the respective welding seam 4 is produced in a subsequent, separate processing run.

The invention claimed is:

1. An arrangement comprising:
    a first metal sheet having an L-, U- or V-shaped flange which is folded over,
    a second metal sheet which overlaps said flange on the inside or the outside or faces an end or a face side of said flange to form a joint with said flange,
    a flanging and welding or soldering tool with
        a tool head,
        a connector for connecting the tool head to an actuator,
        a flanging member, arranged on the tool head, for roll-flanging or slide-flanging,
        a welding or soldering tool arranged on the tool head, and
    wherein the flanging member folds the flange of the first metal sheet into a position or orientation required for welding or soldering, and the welding or soldering tool produces a seam near to the position where the flanging member is in contact with the flange, and
    wherein the flanging member during folding the flange in said position presses on the first metal sheet and/or on the second metal sheet for the flanging process, and at the same time said flanging member presses the first and second metal sheet against each other for the welding or soldering process so that the second metal sheet for the welding or soldering process abuts the inside, the outside or the face side of a free end of the flange and the welding or soldering tool connects the second metal sheet directly to said inside or said outside or said face side of said free end of the flange of the first metal sheet.

2. The arrangement according to claim 1, wherein the flanging member and the welding or soldering tool and an energy beam of the welding or soldering tool which serves for heating the composite to be produced, are located at a small distance from each other.

3. The arrangement according to claim 1, wherein the welding or soldering tool can pivot back and forth about a pivoting axis in a Cartesian co-ordinate system of the tool head.

4. The arrangement according to claim 1, wherein the welding or soldering tool is arranged on the tool head such that it can be moved back and forth along a translational axis which is fixed in relation to the tool head, wherein the translational axis comprises at least a directional component which is perpendicular to a folded-over flange of the component parts.

5. The arrangement according to claim 3, wherein a sensor is arranged on the tool head, by means of which the progression of a joint for a welding or soldering seam to be produced can be scanned during a movement of the tool head in the longitudinal direction of a flanging edge which is to be shaped using the flanging member.

6. The arrangement according to claim 1, wherein the flanging member is a flanging roller comprising a running surface which presses against one of the component parts during flanging and is circular-cylindrical or has a diameter which evenly decreases axially in one direction.

7. The arrangement according to claim 1, wherein a cleaning means for the flanging member is arranged on the tool head, using which the flanging member can be cleaned during flanging.

8. The arrangement according to claim 3, wherein the welding or soldering tool can pivot back and forth from a neutral position against a restoring spring force in each case.

9. The arrangement according to claim 4, wherein a laser or soldering tool is arranged on the tool head that it can be moved back and forth from a neutral position against a restoring spring force in each case.

* * * * *